United States Patent
Lindsay

(10) Patent No.: US 9,771,021 B1
(45) Date of Patent: Sep. 26, 2017

(54) PEDESTRIAN MARKING SYSTEMS

(71) Applicant: Toyota Motor Engineering & Manufacturing North America, Inc., Erlanger, KY (US)

(72) Inventor: Brian L. Lindsay, Ann Arbor, MI (US)

(73) Assignee: Toyota Motor Engineering & Manufacturing North America, Inc., Erlanger, KY (US)

( * ) Notice: Subject to any disclaimer, the term of this patent is extended or adjusted under 35 U.S.C. 154(b) by 0 days.

(21) Appl. No.: 15/145,254

(22) Filed: May 3, 2016

(51) Int. Cl.
*B60Q 1/34* (2006.01)
*B60Q 1/52* (2006.01)
*B60Q 1/26* (2006.01)

(52) U.S. Cl.
CPC ........... *B60Q 1/525* (2013.01); *B60Q 1/2696* (2013.01); *B60Q 1/34* (2013.01)

(58) Field of Classification Search
CPC ..................................................... B60Q 1/525
USPC ........................................................ 340/465
See application file for complete search history.

(56) References Cited

U.S. PATENT DOCUMENTS

| | | | |
|---|---|---|---|
| 8,571,743 B1 * | 10/2013 | Cullinane | G05D 1/00 701/23 |
| 8,954,252 B1 | 2/2015 | Urmson et al. | |
| 9,196,164 B1 | 11/2015 | Urmson et al. | |
| 9,566,901 B1 * | 2/2017 | Lindsay | B60Q 1/32 |
| 9,583,003 B2 * | 2/2017 | Shimizu | G08G 1/166 |
| 2005/0200467 A1 * | 9/2005 | Au | B60Q 1/34 340/465 |
| 2005/0253694 A1 | 11/2005 | Kuznarowis | |
| 2009/0322566 A1 * | 12/2009 | Shirakawa | G01C 21/20 340/944 |
| 2011/0128161 A1 * | 6/2011 | Bae | B60Q 1/506 340/901 |

(Continued)

FOREIGN PATENT DOCUMENTS

CN 2147596 Y 11/1993
JP 2005157873 A 6/2005

(Continued)

OTHER PUBLICATIONS

US 8,914,212, 12/2014, Urmson et al. (withdrawn)

*Primary Examiner* — Santiago Garcia
(74) *Attorney, Agent, or Firm* — Dinsmore & Shohl LLP

(57) ABSTRACT

Pedestrian marking systems, vehicles containing the same, and methods of providing pedestrian marking lighting are disclosed. A system includes a light emitting module having light emitting diodes, a sensor module, and a master controller. The master controller is includes a storage medium with instructions that direct the master controller to receive data from the sensor module, where the data provides an indication of a pedestrian located in the vicinity of the vehicle, determine location coordinates of the pedestrian, determine a direction of light based on the location coordinates such that the light is aimed at the pedestrian, direct the light emitting module to selectively activate the light emitting diodes such that the light emitting diodes produce a collective beam that corresponds to the first direction, determine that the vehicle is turning in a direction towards the pedestrian, and provide a notification to the pedestrian that the vehicle is turning.

19 Claims, 11 Drawing Sheets

(56) References Cited

U.S. PATENT DOCUMENTS

| | | | | |
|---|---|---|---|---|
| 2011/0313609 A1* | 12/2011 | Endo | ................ | G08G 1/096716 |
| | | | | 701/23 |
| 2012/0166072 A1* | 6/2012 | Tamaoki | ......... | B60W 30/18154 |
| | | | | 701/300 |
| 2014/0252949 A1* | 9/2014 | Ko | .......................... | F21S 48/20 |
| | | | | 315/77 |
| 2015/0172582 A1* | 6/2015 | Kiyohara | ........... | G06K 9/00791 |
| | | | | 348/322 |
| 2015/0258928 A1* | 9/2015 | Goto | ..................... | B60Q 1/085 |
| | | | | 701/49 |
| 2015/0329043 A1* | 11/2015 | Skvarce | ................. | B60Q 9/008 |
| | | | | 340/435 |
| 2016/0052762 A1* | 2/2016 | Swift | .................... | B60Q 5/005 |
| | | | | 340/425.5 |
| 2016/0121791 A1* | 5/2016 | Shimizu | ................. | G08G 1/166 |
| | | | | 340/435 |
| 2016/0148511 A1* | 5/2016 | Shibata | .................. | G08G 1/162 |
| | | | | 701/119 |
| 2016/0272215 A1* | 9/2016 | Laine | ..................... | B60W 50/14 |
| 2016/0335892 A1* | 11/2016 | Okada | ....................... | B60T 7/22 |
| 2016/0339833 A1* | 11/2016 | Uchida | ................... | B60Q 1/085 |
| 2016/0379063 A1* | 12/2016 | Sorstedt | ................ | B60Q 1/525 |
| | | | | 348/148 |

FOREIGN PATENT DOCUMENTS

| | | | |
|---|---|---|---|
| JP | 2005161977 | A | 6/2005 |
| JP | 2006176020 | A | 7/2006 |
| JP | 3941757 | B2 | 7/2007 |
| JP | 1888831 | B2 | 2/2012 |
| JP | 2013103628 | A | 5/2013 |
| JP | 2014058173 | A | 4/2014 |
| JP | 2015033939 | A | 2/2015 |

\* cited by examiner

PEDESTRIAN MARKING SYSTEMS

TECHNICAL FIELD

The present specification generally relates to identification systems and, more specifically, to a vehicle system that detects pedestrians in a vehicle's path and provides a warning to the pedestrian.

BACKGROUND

In some areas, particularly metropolitan areas, vehicles and pedestrians may co-exist in close proximity to each other. While sometimes pedestrians have their own thoroughfare for travel that is separate from a vehicle roadway (e.g., a sidewalk), occasionally pedestrians may have to enter the vehicle roadway, such as, for example, to cross a street. While pedestrians may generally be vigilant in assessing their surroundings and entering a roadway without being hit by a vehicle, this may become increasingly difficult in situations where the vehicle does not signal an intent to change its direction, where the area is dark or poorly illuminated, and/or where the pedestrian does not notice the vehicle. In addition, because of certain driving conditions such as weather, nighttime driving, or the like, a driver of the vehicle or an autonomous system within the vehicle may not notice the pedestrian's presence in the roadway.

Accordingly, a need exists for a pedestrian identification system that detects the presence of pedestrians that are generally in the path of the vehicle.

SUMMARY

In one embodiment, a pedestrian marking system in a vehicle includes a light emitting module having a plurality of light emitting diodes, a sensor module, and a master controller. The master controller includes a non-transitory, processor readable storage medium containing machine-readable instructions that direct the master controller to receive data from the sensor module, where the data provides an indication of a pedestrian located in the vicinity of the vehicle, determine location coordinates of the pedestrian with respect to the vehicle, determine a direction of light based on the location coordinates of the pedestrian such that the direction of light is aimed at the pedestrian, direct the light emitting module to selectively activate the plurality of light emitting diodes such that the plurality of light emitting diodes produce a collective beam that corresponds to the first direction, determine that the vehicle is turning in a direction towards the pedestrian, and provide a notification to the pedestrian that the vehicle is turning.

In another embodiment, a method of providing pedestrian marking lighting on a vehicle includes receiving, by a master controller of a pedestrian marking system, data from a sensor module, where the data is indicative of a pedestrian located in the vicinity of the vehicle, determining, by the master controller, location coordinates of the pedestrian with respect to the vehicle, determining, by the master controller, a direction of light based on the location coordinates of the pedestrian such that the direction of light is aimed at the pedestrian, directing, by the master controller, a light emitting module to selectively activate a plurality of light emitting diodes such that the plurality of light emitting diodes produce a collective beam that corresponds to the first direction, determining, by the master controller, that the vehicle is turning in a direction towards the pedestrian, and providing, by the master controller, a notification to the pedestrian that the vehicle is turning.

In yet another embodiment, a vehicle include a pedestrian marking system. The pedestrian marking system includes a light emitting module having a plurality of light emitting diodes and an LED controller for selectively activating one or more of the plurality of light emitting diodes in a pattern to produce a particularly aimed collective beam of light and to produce a turn indicator light, a sensor module, and a master controller comprising a processing device and a non-transitory, processor-readable storage medium. The non-transitory, processor-readable storage medium includes one or more programming instructions that, when executed, cause the processing device to receive data from the sensor module, where the data is indicative of a pedestrian located in the vicinity of the vehicle, determine first location coordinates of the pedestrian with respect to the vehicle, determine a first direction of light based on the first location coordinates of the pedestrian such that the first direction of light is aimed at the pedestrian, direct the LED controller to selectively activate the plurality of light emitting diodes such that the plurality of light emitting diodes produce a collective beam that corresponds to the first direction, determine that the vehicle is making a turn in a direction towards the pedestrian, direct the light emitting module to emit the turn indicator light in the direction of the turn, and when the pedestrian moves with respect to the vehicle to an area outside of the direction of the light, determine second location coordinates of the pedestrian with respect to the vehicle, determine a second direction of light based on the second location coordinates such that the second direction of light is aimed at the pedestrian, and direct the light emitting module to selectively activate the plurality of light emitting diodes such that the plurality of light emitting diodes produce the collective beam that corresponds to the second direction.

These and additional features provided by the embodiments described herein will be more fully understood in view of the following detailed description, in conjunction with the drawings.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

DETAILED DESCRIPTION

The embodiments described herein are generally directed to a vehicle system that determines whether pedestrians are located within the path of the vehicle in which the vehicle system is installed, causes a pedestrian marking light to illuminate the pedestrian such that the pedestrian is aware of the vehicle and/or the driver of the vehicle is aware of the pedestrian, and activates a turn signal to indicate to the pedestrian that the vehicle is turning towards the pedestrian. As such, the vehicle system helps to avoid a potential collision between the pedestrian and the vehicle in which the vehicle system is installed. In some embodiments, the vehicle system may leverage certain existing components of the vehicle to function, thereby avoiding additional manufacturing time, expense, and complexity in assembling the vehicle system.

Figure 1:
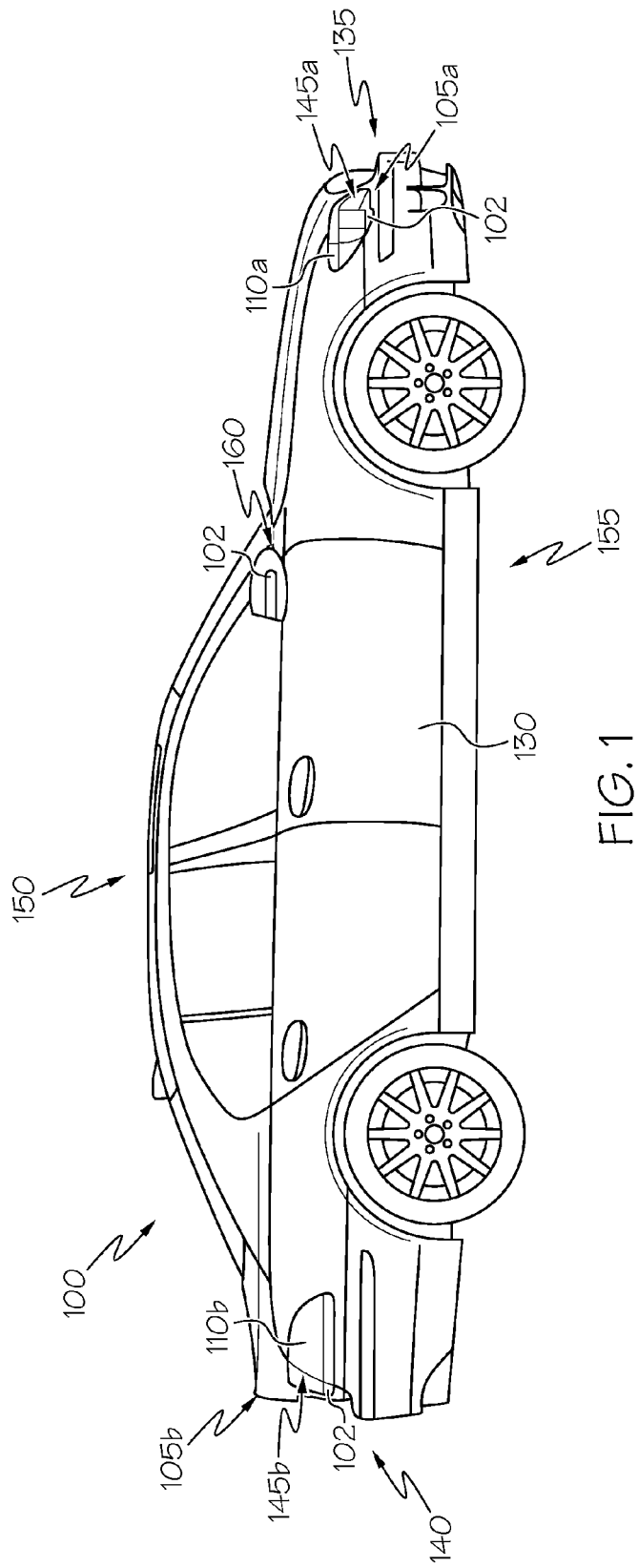
FIG. 1 depicts a side perspective view of an illustrative vehicle with a pedestrian marking system according to one or more embodiments shown and described herein.
Figure 2:
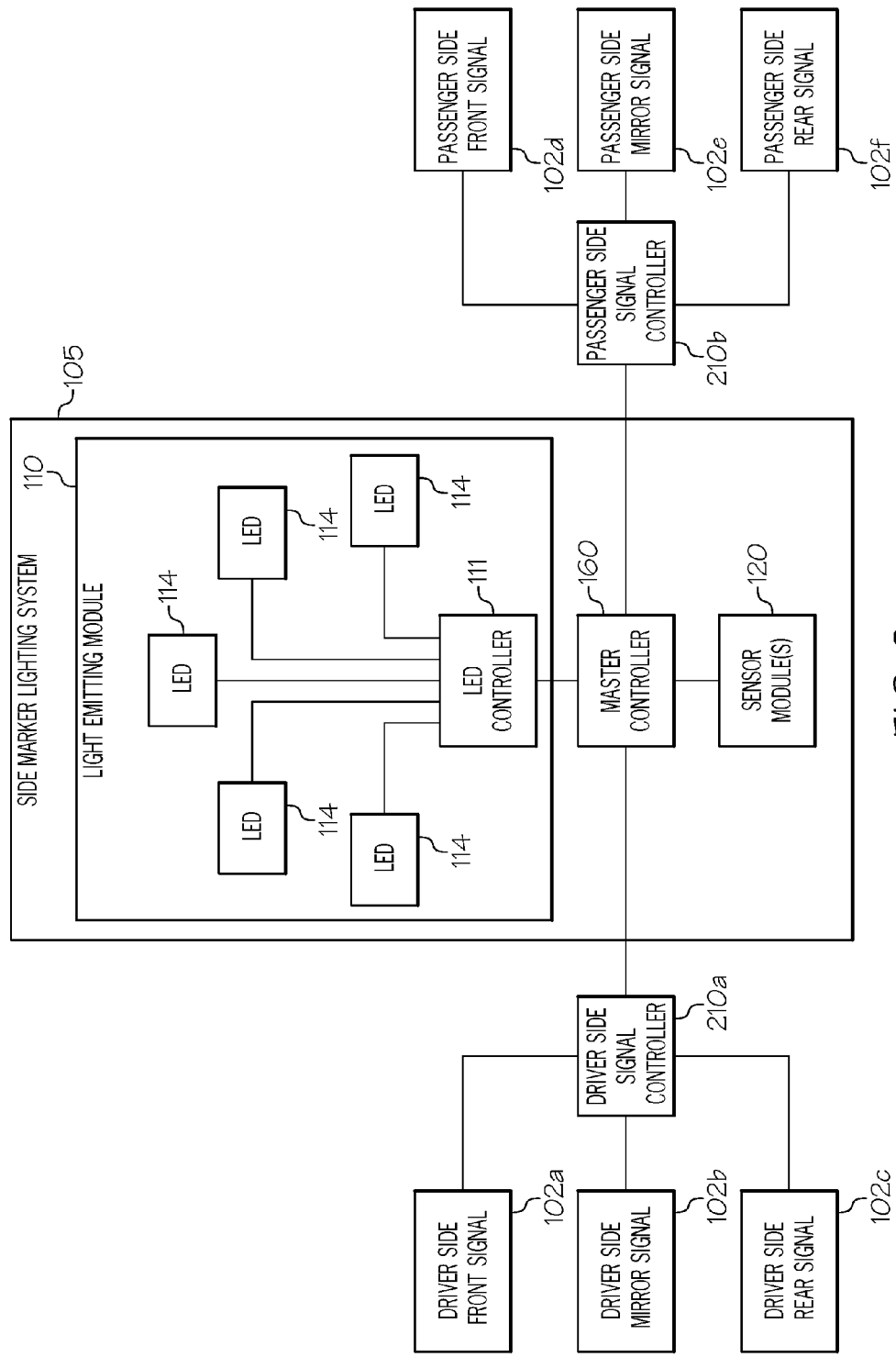
FIG. 2 depicts a schematic block diagram of an illustrative pedestrian marking system according to one or more embodiments shown and described herein.

FIG. 1 depicts an illustrative vehicle, generally designated 100, containing at least one front pedestrian marking system 105a and at least one rear pedestrian marking system 105b, which are collectively referred to as pedestrian marking systems 105 or generically referred to as a pedestrian marking system 105. The front pedestrian marking system 105a generally includes one or more front light emitting modules 110a. Similarly, the rear pedestrian marking system 105b generally includes one or more rear light emitting modules 110b. Each of the front light emitting modules 110a and the rear light emitting modules 110b may collectively be referred to herein as light emitting modules 110 and generically referred to as a light emitting module 110. Referring also to FIG. 2, each of the pedestrian marking systems 105 may also include one or more sensor modules 120 and a master controller 160. As will be described in greater detail herein, each of the pedestrian marking systems 105 may function such that the one or more sensor modules 120 sense a presence and/or location of a pedestrian in the vehicle's intended path, the master controller 160 determines an appropriate illumination and transmits one or more control signals to the one or more light emitting modules 110, and the one or more light emitting modules 110 illuminate the pedestrian based on the transmitted control signals.

In general, each of the components of the pedestrian marking systems 105 may be located on a side 130 of the vehicle 100. However, such a location is merely illustrative. That is, in other embodiments, certain components of the pedestrian marking systems 105 (such as the one or more sensor modules 120) may be located elsewhere with respect to the vehicle 100. In addition, the various components of the pedestrian marking system 105 may be particularly positioned in a location where the light emitting module 110 can emit a beam of light on a pedestrian, provide a turning indicator, and/or the like, as described in greater detail herein. In some embodiments, certain components of the pedestrian marking systems 105, particularly one or more of the sensor modules 120, may be located on a front 135 of the vehicle 100, a rear 140 of the vehicle 100, at a top 150 of the vehicle 100, and/or at a bottom 155 of the vehicle 100. In some embodiments, the pedestrian marking systems 105 (and/or a component thereof) may be integrated into existing components of the vehicle 100, as described in greater detail herein. In other embodiments, the pedestrian marking systems 105 and/or components thereof may be standalone units integrated with the vehicle 100, not integrated into existing components.

While FIG. 1 depicts a single front pedestrian marking system 105a and a single rear pedestrian marking system 105b, it should be understood that the present disclosure is not limited to two pedestrian marking systems 105, and that greater or fewer pedestrian marking systems 105 may be used without departing from the scope of the present disclosure. For example, in some embodiments, the vehicle 100 may include two front pedestrian marking systems 105a and/or two rear pedestrian marking systems 105b on either side of the vehicle 100. In some embodiments, the various pedestrian marking systems 105 on one side of the vehicle 100 may work in tandem with each other to detect, track, and illuminate a pedestrian, as well as notify the pedestrian of the vehicle's intended turn, as described in greater detail herein. In other embodiments, the various pedestrian marking systems 105 may work independently of one another to detect, track, and illuminate a pedestrian, particularly in instances where multiple pedestrians are present.

In some embodiments, portions of the front pedestrian marking system 105a may be shared with the rear pedestrian marking system 105b. For example, the front pedestrian marking system 105a may share the same sensor modules 120 with the rear pedestrian marking system 105b such that the sensor modules 120 sense a pedestrian and transmit signals that are used to adjust the direction of the light emitted from both the front light emitting module 110a and the rear light emitting module 110b.

In some embodiments, each of the pedestrian marking systems 105 may include a light emitting module 110a, 110b and a corresponding sensor module 120. For example, as shown in FIG. 1, each of the pedestrian marking systems 105 may be wholly contained on or near a headlamp assembly 145*a* or a vehicle tail lamp assembly 145*b*. However, various components of each of the pedestrian marking systems 105 may be located elsewhere. For example, in some embodiments, the front light emitting module 110*a* may be located on the headlamp assembly 145*a* whereas the sensor module 120 is located at another location on the vehicle, such as at another location on the side 130 of the vehicle 100, the front 135 of the vehicle 100, and/or the rear 140 of the vehicle 100. For example, the sensor module 120 may be part of any object detection system of the vehicle 100 that uses one or more computing devices, such as any type of vehicle electronic control unit (ECU), handheld, desktop, or other computing devices, or multiple computing devices. Such a configuration may allow, for example, each of the pedestrian marking systems 105 to effectively detect a pedestrian and accurately illuminate the pedestrian.

In some embodiments, the pedestrian marking systems 105 may be communicatively coupled to one or more turn signal indicators 102, such as standard vehicle turn signal indicators that are installed on the vehicle 100 to indicate the vehicle's turning direction. The one or more turn signal indicators 102 may commonly be located, for example, on the front 135 of the vehicle 100, on the rear 140 of the vehicle 100, on a side mirror 160 of the vehicle, and/or the like. In some embodiments, the one or more turn signal indicators 102 may be particularly positioned on the vehicle 100 according to certain government regulations. The one or more turn signal indicators 102 may project light, such as a flashing light, to indicate the turning direction of the vehicle 100. For example, if the vehicle is turning right, various ones of the one or more turn signal indicators 102 located on a right side of the vehicle 100 may flash. The one or more turn signal indicators 102 may project a particular colored light, such as amber light. In some embodiments, the one or more turn signal indicators 102 described herein may be specific indicators for the purposes of indicating the turning direction of the vehicle 100 to a pedestrian, and may therefore be components that are separate from the standard turn signal indicators on the vehicle 102. In such embodiments, the turn signal indicators 102 may operate solely for the purposes of indicating to a pedestrian, therefore operating separately from the standard turn signal indicators on the vehicle 102.

Referring particularly to FIG. 2, each of the light emitting modules 110 is generally a device or apparatus that selectively emits a collective beam of light in a particular direction therefrom and automatically changes the aim of the collective beam of light, such as, for example, in response to a moving pedestrian and/or movement of the vehicle 100 without any physical movement thereof. To achieve such a functionality, each of the light emitting modules 110 may include one or more light emitting diodes (LEDs) 114 and an LED controller 111.

The LED controller 111 is a device that selectively provides an on or an off signal to each of the LEDs 114 to cause each of the LEDs 114 to independently activate or deactivate according to a chosen lighting pattern. As such, each of the LEDs 114 is controllable independently from one another. In some embodiments, the LEDs 114 may be controlled in one or more groups (e.g., an array of LEDs 114). In some embodiments, the LEDs 114 may be controlled individually.

To individually control each of the LEDs 114, the LED controller 111 may be a control device that is communicatively and/or electrically coupled to each of the LEDs 114 such that the LED controller 111 can control electrical power supplied to each of the LEDs 114 and/or transmit activation/deactivation signals to each of the LEDs 114. Illustrative examples of the LED controller 111 include, but are not limited to, a processing device and associated non-transitory, processor-readable memory, a voltage controlled variable resistor, or the like.

Figure 3:
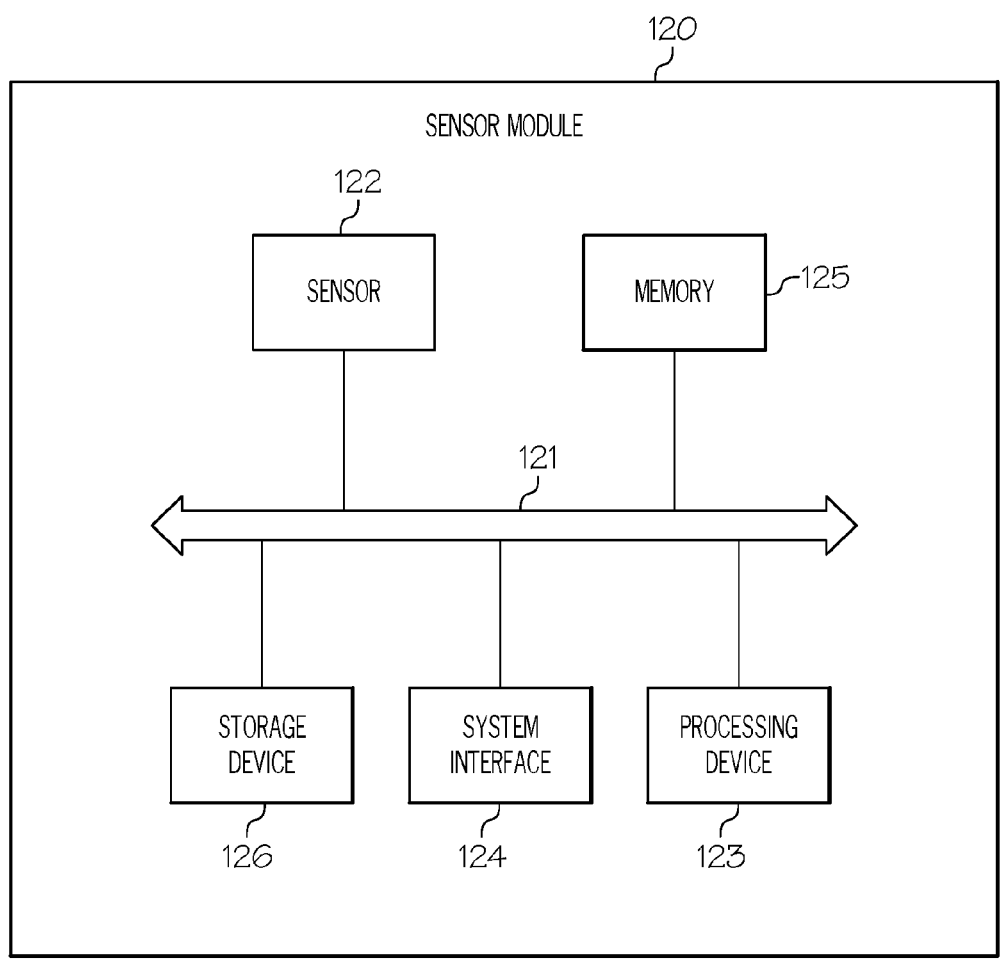
FIG. 3. depicts a schematic block diagram of illustrative components of a sensor module according to one or more embodiments shown and described herein.

Referring to FIG. 2, each of the one or more sensor modules 120 may generally be a unit that continuously senses and detects objects adjacent to and/or approaching the vehicle 100. In addition, each of the one or more sensor modules 120 may be a unit that can distinguish between a pedestrian and other moving or nonmoving objects, such as vehicles, trees, mailboxes, buildings, and the like, even when the vehicle 100 is in motion. Illustrative hardware components of each of the one or more sensor modules 120 are depicted in FIG. 3. A bus 121 may interconnect the various components. A processing device 123, such as a computer processing unit (CPU) may be the central processing unit of the sensor module 120, performs calculations and logic operations that may be necessary to execute one or more program steps. The processing device 123, alone or in conjunction with the other devices disclosed in FIG. 3, is an illustrative processing device, computing device, processor, or combination thereof, as such terms are used within this disclosure. While the processing device 123 is shown as part of the sensor module 120, the processing device 123 may be used by any object detection system of the vehicle 100 such as any one or more of a vehicle ECU, handheld, desktop, or other computing device. Memory 125, such as (but not limited to) read only memory (ROM) and random access memory (RAM), may constitute illustrative memory devices (i.e., non-transitory, processor-readable storage media). Such memory 125 may include one or more programming instructions thereon that, when executed by the processing device 123, cause the processing device 123 to complete various processes, such as the processes described herein.

A storage device 126, which may generally be a storage medium that is separate from the memory 125, may contain a repository for storing images and information as described herein. The storage device 126 may be any physical storage medium, including, but not limited to, a hard disk drive (HDD), memory, removable storage, and/or the like. While the storage device 126 is depicted as a local device, it should be understand that the storage device may be a remote storage device, such as a storage device that is also used to store data for other vehicle components, other pedestrian marking system components, a server computing device, or the like.

A system interface 124 may generally provide the sensor module 120 with an ability to interface with one or more other components of the pedestrian marking system 105 (FIG. 1) or other vehicle components and/or systems. Communication may occur using various communication ports (not shown). An illustrative communication port may be attached to a communications network, such as a vehicle communications network, a pedestrian marking system network, a direct connection, and/or the like.

The sensor module 120 may use any one or more sensors 122 communicatively coupled to the processing device 123 for detecting an object. The one or more sensors 122 may be used in conjunction with vehicle-to-vehicle communication or alone. The one or more sensors 122 can include, but are not limited to, imaging devices (e.g., cameras), light detection and ranging (LIDAR) systems, RADAR systems, and proximity sensors. Multiple types of sensors 122 can be used to provide a variety of information regarding areas adjacent to the vehicle 100.

As mentioned hereinabove, in some embodiments, the one or more sensors 122 may include an imaging device, which is generally any device that can image an area adjacent to the vehicle 100 (FIG. 1). Nonlimiting examples of an imaging device include cameras, motion detectors, and/or the like. The imaging device may be arranged such that a field of view of the imaging device includes at least a portion of the area adjacent to the vehicle 100 to be imaged. In some embodiments, the field of view includes the entire area adjacent to the vehicle 100 to be imaged. In other embodiments where the field of view does not include the entire area adjacent to the vehicle 100 to be imaged, the imaging device may be movable (e.g., via a motor or the like) to capture the entire area. The imaging device may be particularly configured to determine a location (e.g., a distance and/or a positioning) of a pedestrian and provide location coordinates corresponding to the pedestrian's location. In addition, the imaging device may include any additional components generally recognized as being suitable for imaging the area, including, but not limited to, an image sensor, a lens, one or more movement mechanisms, and/or the like.

Referring also to FIG. 1, the various components depicted in FIG. 3 may generally provide each of the one or more sensor modules 120 with a capability of continuously imaging one or more areas adjacent to the vehicle 100 and based on the continuous imaging, determining if pedestrians are adjacent to the vehicle 100 and/or are moving toward the vehicle 100. For example, the processing device 123 may continuously obtain images from the imaging device 122, access the storage device 126 to retrieve stored data, and compare the stored data with obtained images to determine whether the obtained images contain a pedestrian. If the processing device 123 determines that the images contain a pedestrian, the pedestrian's location may be determined and location coordinates of the pedestrian may be continuously transmitted, as described in greater detail herein.

Each of the sensor modules 120 may be communicatively coupled to various other components, including components depicted in FIGS. 1 and 2. For example, each of the sensor modules may be communicatively coupled other components of the pedestrian marking systems 105, including the master controller 160 and/or the LED controller 111, as well as one or more signal controllers 210.

The master controller 160 is generally a control device that receives one or more signals from the one or more sensor modules 120, determines that a pedestrian is approaching the vehicle 100, determines the location of the pedestrian, and transmits instructions to the LED controller 111 indicating a direction of the light to be emitted from the LEDs 114 such that a beam of light illuminates the pedestrian and/or provides an indication to the pedestrian that the vehicle is turning.

Figure 4:
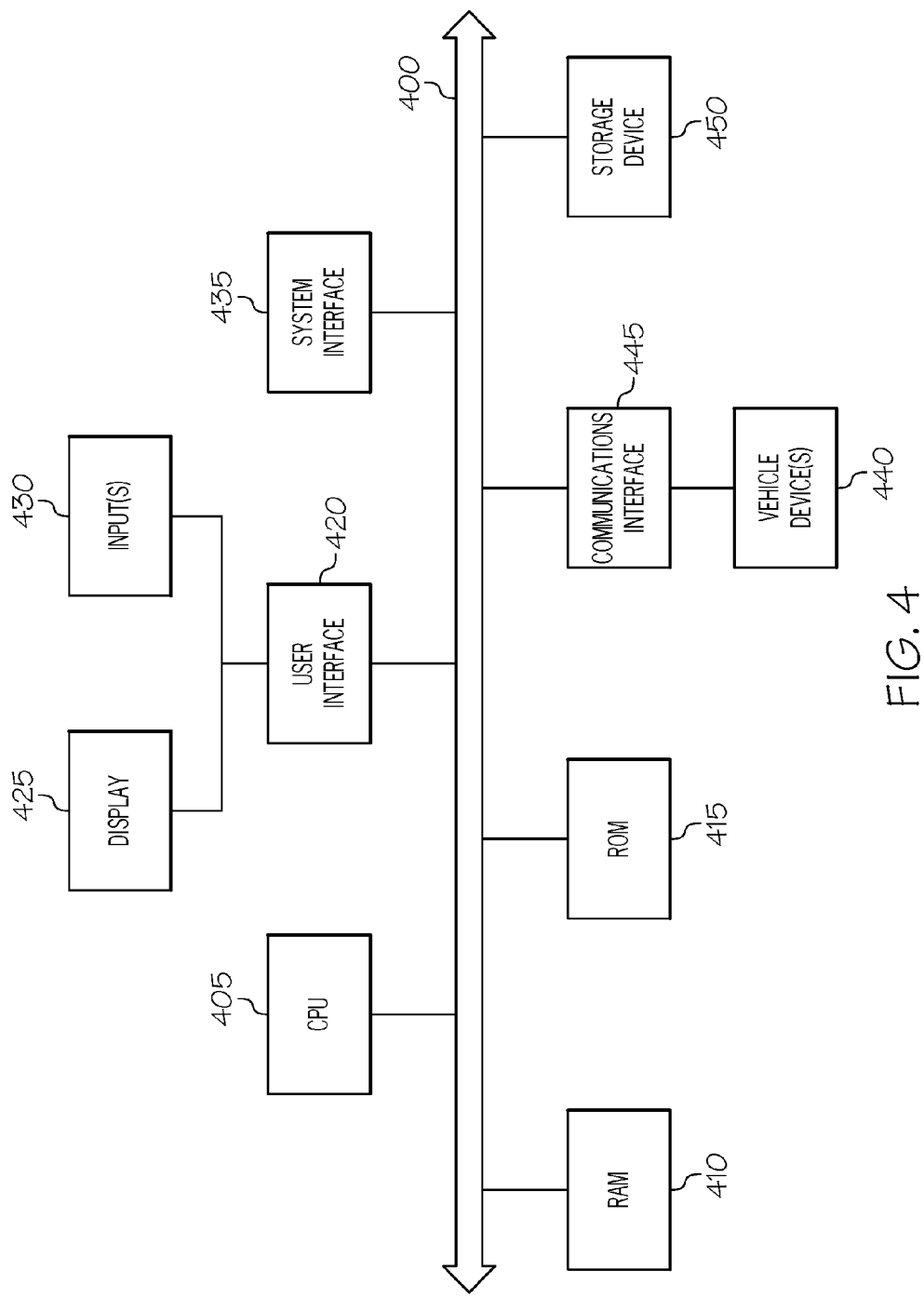
FIG. 4 depicts a schematic block diagram of illustrative computer processing hardware components according to one or more embodiments shown and described herein.

The master controller 160 may also include a plurality of hardware components, particularly components that allow the master controller 160 to receive and monitor data from the sensor modules 120, determine the status of a pedestrian, and transmit instructions to the LED controller 111 as described herein. Illustrative hardware components of the master controller 160 are depicted in FIG. 4. A bus 400 may interconnect the various components. A processing device, such as a computer processing unit (CPU) 405, may be the central processing unit of the computing device, performing calculations and logic operations required to execute a program. The CPU 405, alone or in conjunction with one or more of the other elements disclosed in FIG. 4, is an illustrative processing device, computing device, processor, or combination thereof, as such terms are used within this disclosure. Memory, such as read only memory (ROM) 415 and random access memory (RAM) 410, may constitute illustrative memory devices (i.e., non-transitory processor-readable storage media). Such memory 410, 415 may include one or more programming instructions thereon that, when executed by the CPU 405, cause the CPU 405 to complete various processes, such as the processes described herein. Optionally, the program instructions may be stored on a tangible computer-readable medium such as a compact disc, a digital disk, flash memory, a memory card, a USB drive, an optical disc storage medium, such as a Blu-Ray™ disc, and/or other non-transitory processor-readable storage media.

A storage device 450, which may generally be a storage medium that is separate from the RAM 410 and the ROM 415, may contain a repository or the like for storing the various information, and features described herein. For example, the storage device 450 may store information regarding vehicle positioning that is received from various vehicle components, such as the one or more sensor modules 120 (FIG. 1). The storage device 450 may be any physical storage medium, including, but not limited to, a hard disk drive (HDD), memory, removable storage, and/or the like. While the storage device 450 is depicted as a local device, it should be understood that the storage device 450 may be a remote storage device, such as, for example, a remote server computing device or the like.

An optional user interface 420 may permit information from the bus 400 to be displayed on a display 425 portion of the vehicle 100 (FIG. 1) in audio, visual, graphic, or alphanumeric format. Moreover, the user interface 420 may also include one or more inputs 430 that allow for transmission to and receipt of data from input devices such as a keyboard, a mouse, a joystick, a touch screen, a remote control, a pointing device, a video input device, an audio input device, a haptic feedback device, and/or the like. Such a user interface 420 may be used, for example, to allow a user (e.g., a driver of the vehicle 100 (FIG. 1)) to interact with the master controller 160, such as to receive information regarding pedestrians (e.g., the presence, location, and/or movement of the pedestrian), to change various settings of each of the pedestrian marking systems, and/or the like.

A system interface 435 may generally provide the master controller 160 with an ability to interface with one or more of the components of the pedestrian marking system, including, but not limited to, one or more LED controllers and one or more sensor modules. Communication with the components of the pedestrian marking system may occur using various communication ports. An illustrative communication port may be attached to a communications network, such as an intranet, a local network, a direct connection, and/or the like.

A communications interface 445 may generally provide the master controller with an ability to interface with one or more one or more vehicle components 440 that are external to the pedestrian marking system, such as, for example, any sensors, gauges, electronic control units (ECU), and/or the like. Communication with vehicle components 440 may occur using various communication ports. An illustrative communication port may be attached to a communications network, such as the Internet, an intranet, a local network, a direct connection, and/or the like.

Referring again to FIG. 2, various components of the pedestrian marking system 105 may be communicatively coupled to one or more of a driver side signal controller 210*a* and a passenger side signal controller 210*b*, which may be collectively referred to as signal controllers 210 and generically as a signal controller 210. For example, the master controller 160 of the pedestrian marking system 105 may interface with the signal controllers 210. While FIG. 2 depicts two signal controllers 210, such a depiction is merely illustrative. That is, one or more signal controllers 210 may be used without departing from the scope of the present disclosure.

The signal controllers 210 are generally used to control activation of one or more of a driver side front signal indicator 102a, a driver side mirror signal indicator 102b, a driver side rear signal indicator 102c, a passenger side front signal indicator 102d, a passenger side mirror signal indicator 102e, and a passenger side rear signal indicator 102f, which may collectively be referred to herein as signal indicators 102 and generically as a signal indicator 102. For example, the driver side signal controller 210a may control one or more of the driver side front signal indicator 102a, the driver side mirror signal indicator 102b, and the driver side rear signal indicator 102c, and the passenger side signal controller 210b may control one or more of the passenger side front signal indicator 102d, the passenger side mirror signal indicator 102e, and the passenger side rear signal indicator 102f. The signal controllers 210 may each be a device that selectively provides an on or an off signal to respective ones of the signal indicators 102 to cause the respective ones of the signal indicators 102 to independently activate or deactivate according to a chosen lighting pattern. As such, each of the signal indicators 102 is controllable independently from one another. In some embodiments, the signal indicators 102 may be controlled in one or more groups (e.g., the driver side front signal indicator 102a, the driver side mirror indicator 102b, and the driver side rear signal indicator 102c may be controlled as a first group and the passenger side front signal indicator 102d, the passenger side mirror signal indicator 102e, and the passenger side rear signal indicator 102f may be controlled as a second group). In some embodiments, the signal indicators 102 may be controlled individually.

To control each of the signal indicators 102, the signal controllers 210 may each be a control device that is communicatively and/or electrically coupled to each of the signal indicators 102 such that the signal controllers 210 can control electrical power supplied to each of the signal indicators 102 and/or transmit activation/deactivation signals to each of the signal indicators 102. Illustrative examples of the signal controllers 210 include, but are not limited to, a processing device and associated non-transitory, processor-readable memory, a voltage controlled variable resistor, or the like.

While the embodiment depicted in FIG. 2 shows the signal controllers 210 and the signal indicators 102 as being components external to the pedestrian marking system 105, the present disclosure is not limited to such. That is, in some embodiments, the signal controllers 210 and/or the signal indicators 102 may be a portion of the pedestrian marking system. In some embodiments, the signal indicators 102 may be combined with the light emitting module 110 such that the light emitting module 110 emits light towards the pedestrian and provides a turn indicator as described herein. In such embodiments, the signal indicators 102 may be separate from turn signal indicators that are generally recognized as standard in a vehicle.

Figure 5A:
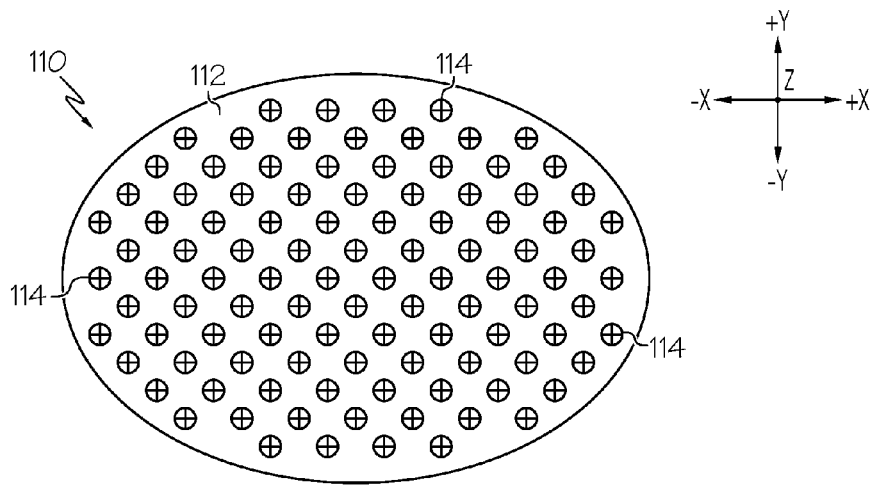
FIG. 5A depicts a front view of an illustrative light emitting module of a pedestrian marking system according to one or more embodiments shown and described herein.
Figure 5B:
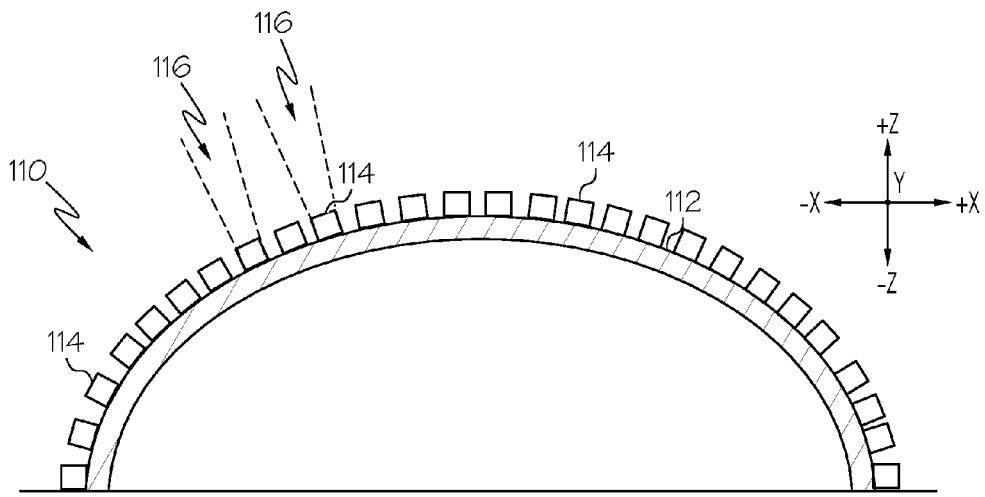
FIG. 5B depicts a cutaway top view of an illustrative light emitting module of a pedestrian marking system according to one or more embodiments shown and described herein.

FIGS. 5A and 5B depict various views of an illustrative light emitting module 110 according to various embodiments. As shown in FIGS. 5A and 5B, the light emitting module 110 may include a surface 112 that supports the plurality of LEDs 114 arranged thereon. As such, the surface 112 may be a substrate supporting the plurality of LEDs 114.

The dimensional aspects of the surface 112 are not limited by this disclosure, and as such, the surface 112 may generally be any size and/or shape. In some embodiments, the surface 112 may be sized and/or shaped to support the plurality of LEDs 114 thereon. For example, as shown in FIG. 5B, the surface 112 may have a convex shape. However, it should be understood that the shape is merely illustrative, and other shapes, whether regular or irregular, are contemplated.

Each of the LEDs 114 is a solid state device that, when activated, emits light from a p-n junction. That is, when a voltage is applied to a lead of each of the LEDs 114, electrons recombine with electron holes within the device, which releases energy in the form of photons. The LEDs 114 described herein may each emit any color of light. For example, in some embodiments, the LEDs 114 may each emit a white or substantially white light. In another example, the LEDs 114 may emit light that corresponds to a color generally recognized for certain vehicle lighting applications, including amber and red colors. That is, LEDs 114 that are arranged in the front pedestrian marking system 105a (FIG. 1) may emit amber light and LEDs 114 that are arranged in the rear pedestrian marking system 105b (FIG. 1) may emit red light. Alternatively, the LEDs 114 may emit a particular color of light, which may be tuned by a filter, a lens, or the like to a different color according to a particular application. In addition, the LEDs 114 described herein may emit the light at a brightness that is sufficient to illuminate a pedestrian that is adjacent to the vehicle 100 in darkness or low light conditions. The LEDs 114 may also emit pulsed light to provide strobe lighting.

The number of LEDs 114 arranged on the surface 112 of each light emitting module 110 is not limited by this disclosure, and may generally be any number of LEDs 114. Each of the LEDs 114 may be particularly arranged on the surface 112 of the light emitting module 110 such that each of the LEDs 114 emits light that is aimed in a particular direction. As will be described in greater detail herein, such a particular arrangement allows for a selective activation/deactivation of each of the LEDs 114 to particularly aim and move a beam of light. In some embodiments, each of the LEDs 114 may be particularly positioned with respect to the surface 112. In some embodiments, all of the LEDs 114 may be positioned in the same manner with respect to the surface 112, whereby the curvature of the surface results in light emitted from each of the LEDs 114 aimed in a different direction. In some embodiments, the LEDs 114 may be arranged in a particular pattern on the surface. For example, the LEDs 114 may be arranged in a grid-like formation. The LEDs 114 may also be arranged in a tightly packed configuration on the surface 112 (e.g., the LEDs 114 contact one another) or may be arranged in a spaced configuration on the surface 112 such that a space exists between two or more LEDs 114.

As particularly shown in FIG. 5B, the surface 112 may be curved such that the LEDs 114 coupled thereto are particularly positioned according to the curvature of the surface 112, which ensures a particular positioning of each of the LEDs 114. The curvature of the surface 112 is not limited by this disclosure, and may be curved in any direction. For example, in some embodiments, the surface 112 may be hemispherical in shape, causing a convex surface 112 that extends outwardly along the +X/−X axes of the coordinate axes depicted in FIG. 5B and outwardly along the +Z/−Z axes of the coordinate axes depicted in FIG. 5B. As such, the convex surface 112 allows each of the LEDs 114 positioned thereon to project a beam of light outwardly in a particular direction, as indicated by the areas 116 bounded by the dashed lines. In addition, the particular direction of the beam of light emitted by each of the LEDs 114 is different for each of the LEDs 114. When the LEDs 114 are arranged in such a manner, the collective beam of light emitted from all of the LEDs 114 may be emitted in every direction at least 180 degrees from the surface 112.

The light emitted by the LEDs 114 may be for the purposes of illuminating a pedestrian to notify the pedestrian of the location and/or orientation of the vehicle 100 and/or to notify the driver of the vehicle 100. In addition, the light emitting by the LEDs 114 may also be for the purposes of signaling to the pedestrian that the vehicle 100 intends to turn in the pedestrian's direction. As such, the LEDs 114 may be particularly configured to emit light at a first color (e.g., white light) for the purposes of illuminating the pedestrian and at substantially the same time, emit light at a second color (e.g., amber light) to indicate the intended turn, as described in greater detail herein.

Figure 5C:
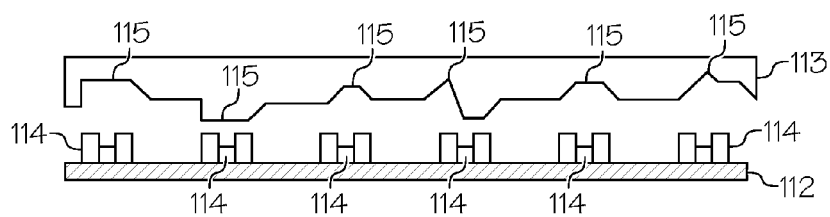
FIG. 5C depicts a cutaway top view of an alternative light emitting module having a lens system according to one or more embodiments shown and described herein.

In an alternative configuration, as shown in FIG. 5C, the LEDs 114 may be arranged on a substantially planar surface 112 (e.g., a planar substrate). In such embodiments, one or more lenses 113 may be positioned over the LEDs 114 such that light projected from the LEDs 114 is transmitted through the lens 113. The lens 113 may be any lens or lens-like structures now known or later developed. That is, the lens 113 may be any component that redirects, focuses, scatters, changes the color, changes the polarity, and/or changes the intensity of the light beam emitted from each of the LEDs 114. In some embodiments, the lens 113 may have one or more features 115 (e.g., optical elements or the like) that direct the light emitted from a corresponding LED 114 such that the resultant light, as it exits the lens 113, is aimed in a particular direction. As such, while all of the LEDs 114 may be facing in the same direction (and thereby emitting light in the same direction), the features 115 of the lens 113 allow the light to be redirected in particular directions such that each of the resulting light beams exiting from the lens are directed in different directions with respect to one another.

Figure 6:
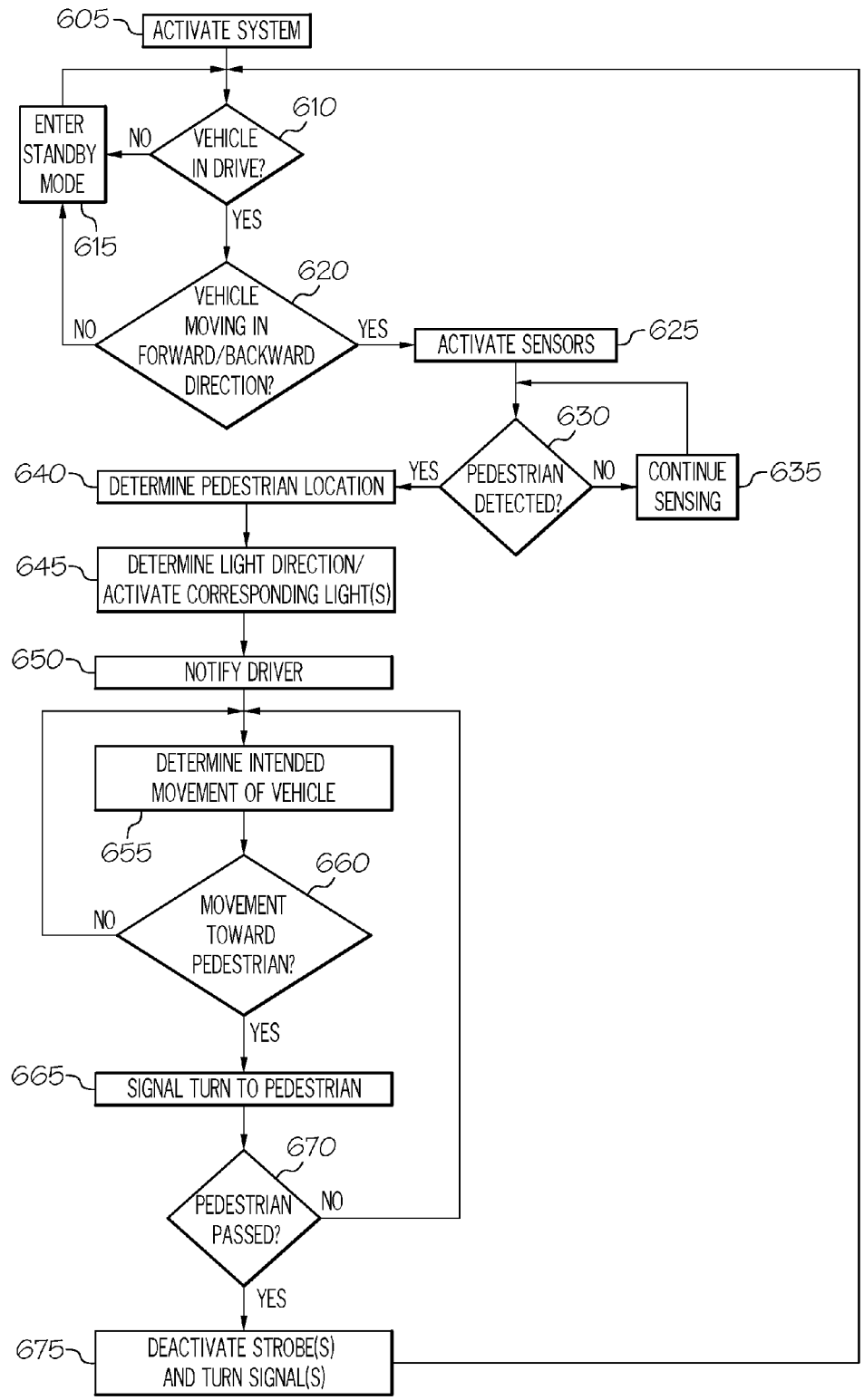
FIG. 6 depicts a flow diagram of an illustrative method of detecting a pedestrian and providing indicators according to one or more embodiments shown and described herein.

Referring now to FIG. 6, each of the pedestrian marking systems described with respect to FIGS. 1-5B may be configured to detect a pedestrian that is approaching and/or in the vicinity of the vehicle 100, project a beam of light from one or more of the light emitting modules that is directed at the pedestrian, and project a signal indicating that the vehicle is turning. In addition, each of the pedestrian marking systems described with respect to FIGS. 1-5B may selectively activate the LEDs within the light emitting modules to ensure that the beam of light emitted from the light emitting modules is appropriately directed and/or does not shine in the face of the pedestrian. Moreover, each of the pedestrian marking systems described with respect to FIGS. 1-5B may selectively activate the LEDs within the light emitting modules to move the emitted beam of light as the location of the pedestrian changes with respect to the vehicle 100.

As shown in FIG. 6, while also referring to FIGS. 1-2, at step 605, one or more of the pedestrian marking systems 105 may be activated. For example, the pedestrian marking systems 105 may activate when the vehicle 100 is turned on, when a particular ambient light level is detected (e.g., nighttime or low light conditions), when a particular switch is activated (e.g., the driver activates the headlights), and/or the like. Activation of the pedestrian marking systems 105 according to step 605 may be omitted in some embodiments, such as, for example, embodiments where the pedestrian marking systems 105 operate as "always on" systems.

At step 610, an optional determination may be made as to whether the vehicle 100 is in a drive state. That is, the determination at step 610 may include determining whether the vehicle 100 is in gear and/or moving (i.e., vehicle is not parked). If the vehicle 100 is not in a drive state, the system may enter a standby state at step 615 until a determination is made that the vehicle 100 is in a drive state. Determining that the vehicle 100 is in a drive state may avoid completing the steps described herein when the vehicle 100 is parked and not actively being driven, particularly in instances where the vehicle 100 is parked adjacent to a sidewalk traversed by pedestrians. However, it should be understood that step 610 is optional and may be omitted.

If the vehicle 100 is in a drive state, an optional determination may be made as to whether the vehicle 100 is moving in a forward or backward direction at step 620. If the vehicle 100 is not moving in a forward or backward direction (e.g., the driver has the vehicle in drive state, but is idling with the brakes applied), the system may enter the standby state at step 615 until a determination is made that the vehicle 100 is moving in the forward or backward direction. Determining that the vehicle 100 is moving in the forward or backward direction may also avoid completing the steps described herein when the vehicle 100 is idling and not moving. However, it should be understood that step 610 is optional and may be omitted to signal to pedestrians when the vehicle 100 is stopped at an intersection and waiting to make a turn.

At step 625, the one or more sensor modules may be activated such that the vicinity of the vehicle 100 is monitored for approaching and/or adjacent pedestrians. That is, the pedestrian marking systems 105 may receive data at the one or more sensor modules 120 and determine whether a pedestrian is approaching the vehicle 100 and/or adjacent to the vehicle 100 based on the obtained data at step 630 (i.e., determining whether a pedestrian is detected). That is, the received data may be indicative of whether a pedestrian is located in the vicinity of the vehicle 100. As such, the one or more sensor modules 105 may sense an area adjacent to the vehicle 100 and transmit the sensed data to the master controller 160, which makes a determination as to whether a pedestrian exists. In other embodiments, the determination may be completed by logic contained within one or more of the sensor modules 105. In such embodiments, the one or more sensor modules 105 may transmit the determination to the master controller 160 for further determination and/or decision making.

If the determination at step 630 is that a pedestrian is not approaching, the process may continue sensing at step 635 and return to step 630. If the determination at step 630 is that a pedestrian is in the vicinity of the vehicle 100 and/or approaching the vehicle 100, the location of the pedestrian may be determined at step 640. The location of the pedestrian may be determined, for example, by determining the coordinates of the pedestrian with respect to the vehicle 100 (e.g., location coordinates). Such a determination may include, for example, determining the pedestrian's coordinates with respect to a particular one of the pedestrian marking systems 105 that will be activated. For example, if the pedestrian is in front of and to the right of the vehicle 100, the determination at step 640 may be made with respect to the front pedestrian marking system 105b that is mounted on a passenger side of the vehicle. In embodiments where the sensor module 120 is not located with the other components of the pedestrian marking system 105, a calculation may be necessary to determine the coordinates based on the location of the other components of the pedestrian marking system 105, such as an accounting of the distance and location relative to each other for the sensor module 120 and the other components of the pedestrian marking system 105.

Such a determination at step 640 may generally be completed by any method of sensing the pedestrian location and mapping the pedestrian that is now known or later developed. For example, determining the pedestrian's coordinates may include receiving data from the one or more sensor modules 120 and mapping the location of the pedestrian to coordinate axes based on the received data.

Once the exact location of the pedestrian has been determined (e.g., a determination of location coordinates), the system may determine how the light should be aimed at the pedestrian (e.g., a direction of light based on the location coordinates of the pedestrian) and activate the corresponding LEDs 114 accordingly at step 645. This may include determining which of the LEDs 114 need be activated to appropriately illuminate the pedestrian. In embodiments where each of the pedestrian marking systems 105 work together to provide pedestrian marking illumination, such a determination/activation at step 645 may also include determining which of the pedestrian marking systems 105 to activate. For example, if the pedestrian is approaching the passenger side of the vehicle 100, a determination may be made that the front pedestrian marking system 105a and/or the rear pedestrian marking system 105b that are located on the passenger side of the vehicle 100 will be activated.

Determining which of the LEDs 114 need to be activated includes accessing data regarding a direction of an individual beam that is emitted from each of the LEDs 114 and determining, based on the data, which individual beams will produce a collective beam that is aimed at the pedestrian. As such, data regarding the positioning of each of the LEDs 114 on the substrate 112 must be accessed, as well as data regarding the shape of the substrate 112.

Figure 7A:
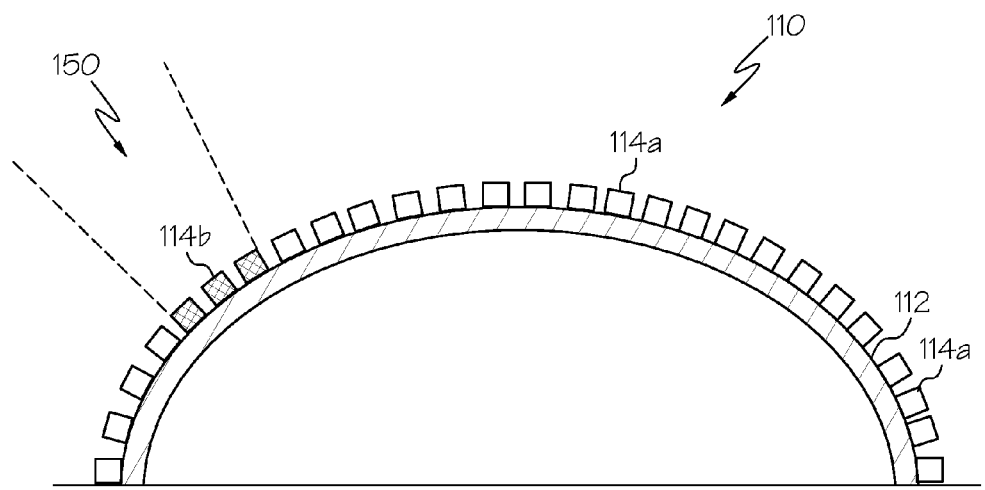
FIG. 7A depicts a cutaway top view of an illustrative pedestrian marking system projecting light in a direction according to one or more embodiments shown and described herein.

Such a determination may include determining that not all of the LEDs need be activated to appropriately illuminate the pedestrian. For example, certain LEDs that emit an individual beam that would not be directed at the pedestrian may not be activated, as the light emitted therefrom may be unnecessary, may be directed at other objects, may cause confusion, and/or may temporarily blind the pedestrian. For example, as shown in FIGS. 7A and 7B, the collective beam 150 may be emitted in a particular direction by a grouping of activated LEDs 114b, whereas inactive LEDs 114a do not emit light.

Referring again to FIGS. 1-2 and 6, the determination at step 645 may be completed by the master controller 160, the LED controller 111, or any combination thereof. For example, the master controller 160 may determine which LEDs to activate based on the data received from the sensor modules 120, and transmit instructions to the LED controller 111 for activating the appropriate LEDs 114. In another example, the master controller 160 may direct the LED controller 111 to determine an appropriate LED activation pattern and activate the corresponding LEDs 114.

Activation of the LEDs 114 according to step 645 may generally be completed by the LED controller 111, as previously described herein. As such, the LED controller 111 of the light emitting module 110 selectively activates the LEDs 114 such that the activated LEDs 114 produce an appropriately directed collective beam 150, as described herein. In embodiments where a plurality of pedestrian marking systems 105 are to be activated (e.g., both a front pedestrian marking system 105a and a rear pedestrian marking system 105b are activated), LED controllers 111 for each of such systems may activate the appropriate LEDs 114. Activation by the LED controller 111 may produce the collective beam 150 directed at the pedestrian, as depicted in FIGS. 7A-7C.

Figure 7B:
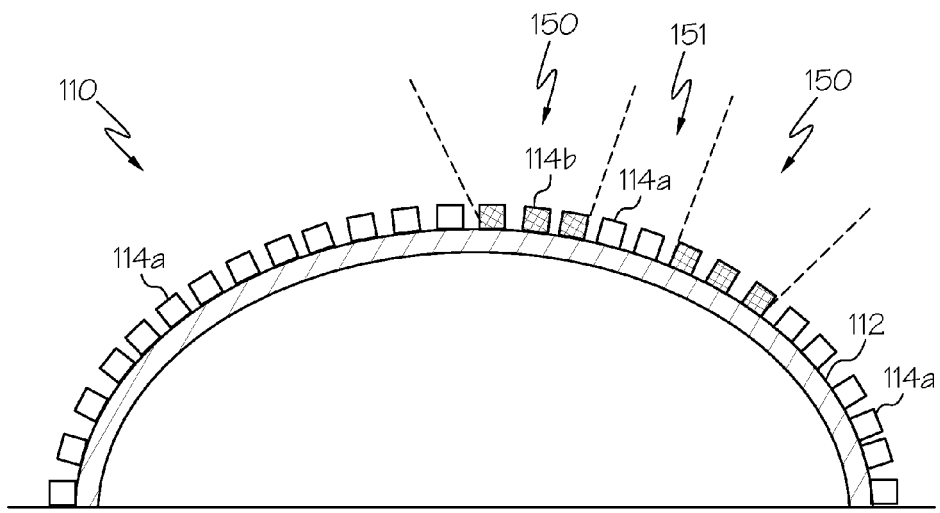
FIG. 7B depicts a cutaway top view of an illustrative pedestrian marking system projecting light having a deluminated zone according to one or more embodiments shown and described herein.
Figure 7C:
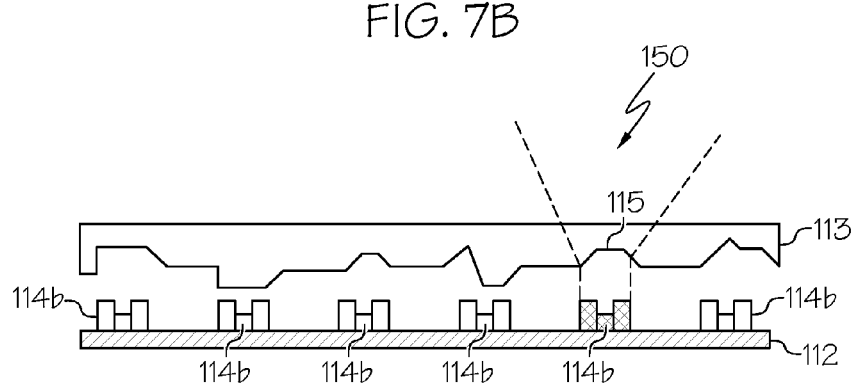
FIG. 7C depicts a cutaway top view of an alternative pedestrian marking system projecting light in a direction according to one or more embodiments shown and described herein.

As particularly depicted in FIG. 7B, in some embodiments, the collective beam 150 may incorporate a deluminated zone 151 therein. The deluminated zone 151 generally corresponds to an area projected onto the pedestrian that would be aimed at the pedestrian's face and could otherwise temporarily blind the pedestrian. As such, the LEDs 114 that would project light in the deluminated zone 151 are inactive LEDs 114a so that no light is projected therefrom. As such, while the collective beam 150 illuminates the pedestrian, light is not projected directly at the face of the pedestrian. Determination of a deluminated zone 151 may be completed as a portion of step 645 (FIG. 6) where coordinates of the location of the pedestrian's face are also determined in addition to the coordinates of the pedestrian. In some embodiments, projecting a deluminated zone 151 within the collective beam 150 may incorporate one or more components and functionality of adaptive driving beam (ADB) systems, as such systems are generally understood.

Referring again to FIGS. 1-2 and 6, the driver of the vehicle 100 may optionally be notified of the pedestrian's location at step 650. That is, the user interface 420 (FIG. 4) may display an image and/or a message and/or may issue an audible warning of the pedestrian. In some embodiments, the driver of the vehicle 100 may also be notified of the pedestrian's location with respect to the vehicle 100. The notification may appear on a combination meter, a navigation screen, a system interface screen, a heads up display projected on the vehicle's windshield, and/or the like. It should be understood that the primary purpose of the present disclosure is to notify the pedestrian, and thus in some embodiments, step 650 may be omitted.

Figure 8:
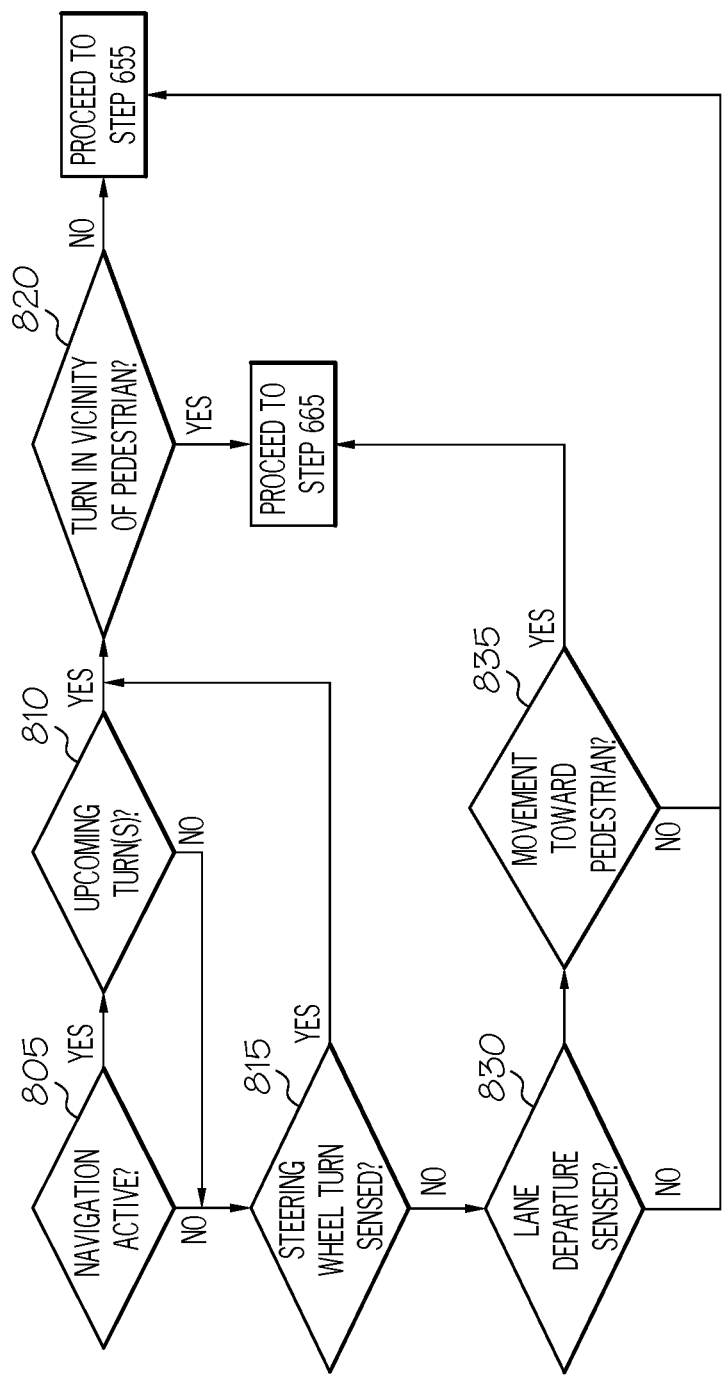
FIG. 8 depicts a flow diagram of an illustrative method of determining whether a vehicle is turning toward a pedestrian according to one or more embodiments shown and described herein.

At step 655, the system may determine the intended movement of the vehicle 100. Such a determination may be necessary to determine whether the vehicle 100 is moving toward the pedestrian at step 660. Referring to FIGS. 1-2 and 8, such a determination of the intended movement of the vehicle 100 may include determining if the vehicle's navigation system (if equipped) is active and mapping a route for the driver of the vehicle 100 to follow. That is, the determination may be whether the vehicle 100 contains a navigation system and the navigation system is providing turn-by-turn directions and/or a map to a particular destination. If the navigation system is active, the system may determine at step 810 whether, based on the navigation system route, whether a turn is impending. Such a determination may include, for example, interfacing the navigation system and/or receiving turn data from the navigation system, where the turn data corresponds to an intended route towards a destination.

If no turn is impending based on the data received from the navigation system or if the navigation system is inactive/nonexistent, a determination may be made as to whether the vehicle is turning based on a sensing of one or more mechanical movements at step 815. For example, the system may interface with one or more sensors that sense whether the steering wheel has been turned, whether the axle supporting the turnable wheels has been adjusted, whether a steer-by-wire system indicates a turn, and/or the like.

Figure 9A:
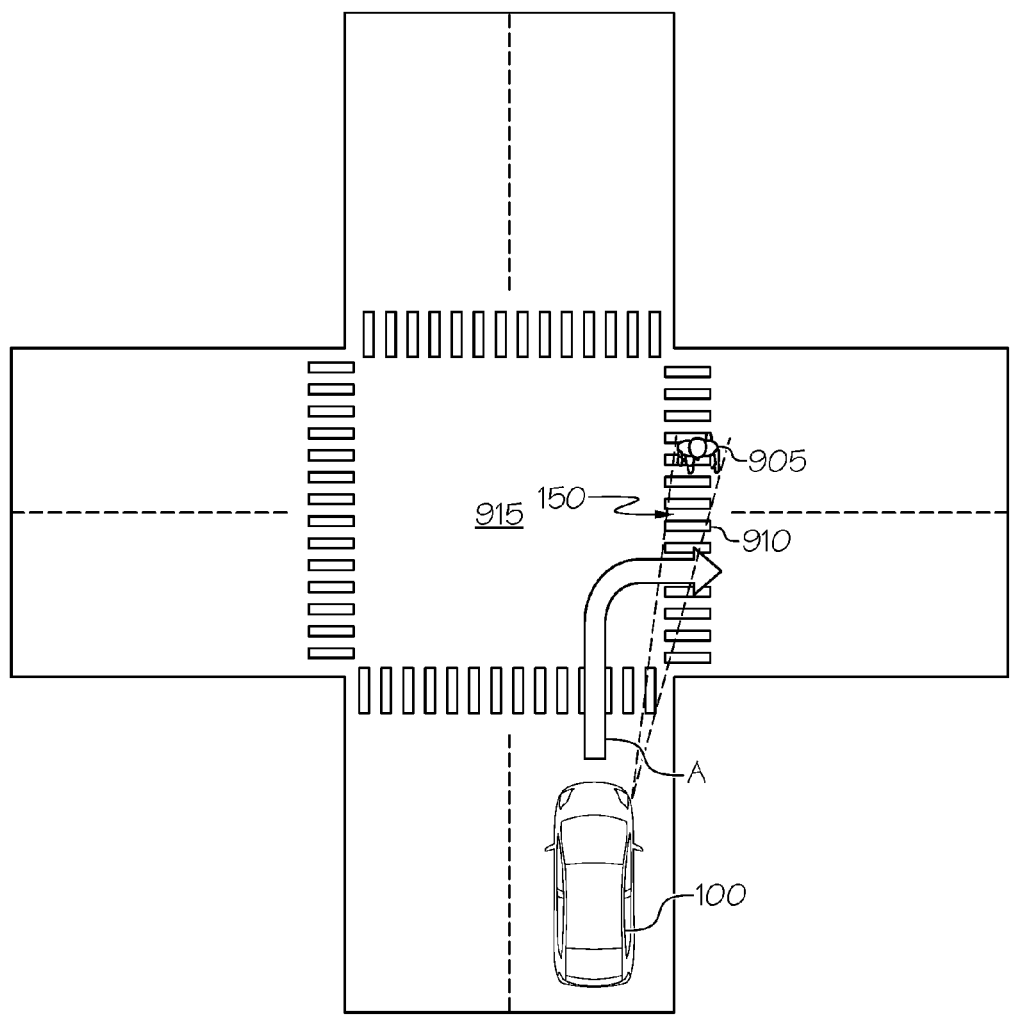
FIG. 9A depicts an illustrative schematic top view of a vehicle and a pedestrian in a crosswalk of an intersection according to one or more embodiments shown and described herein.
Figure 9B:
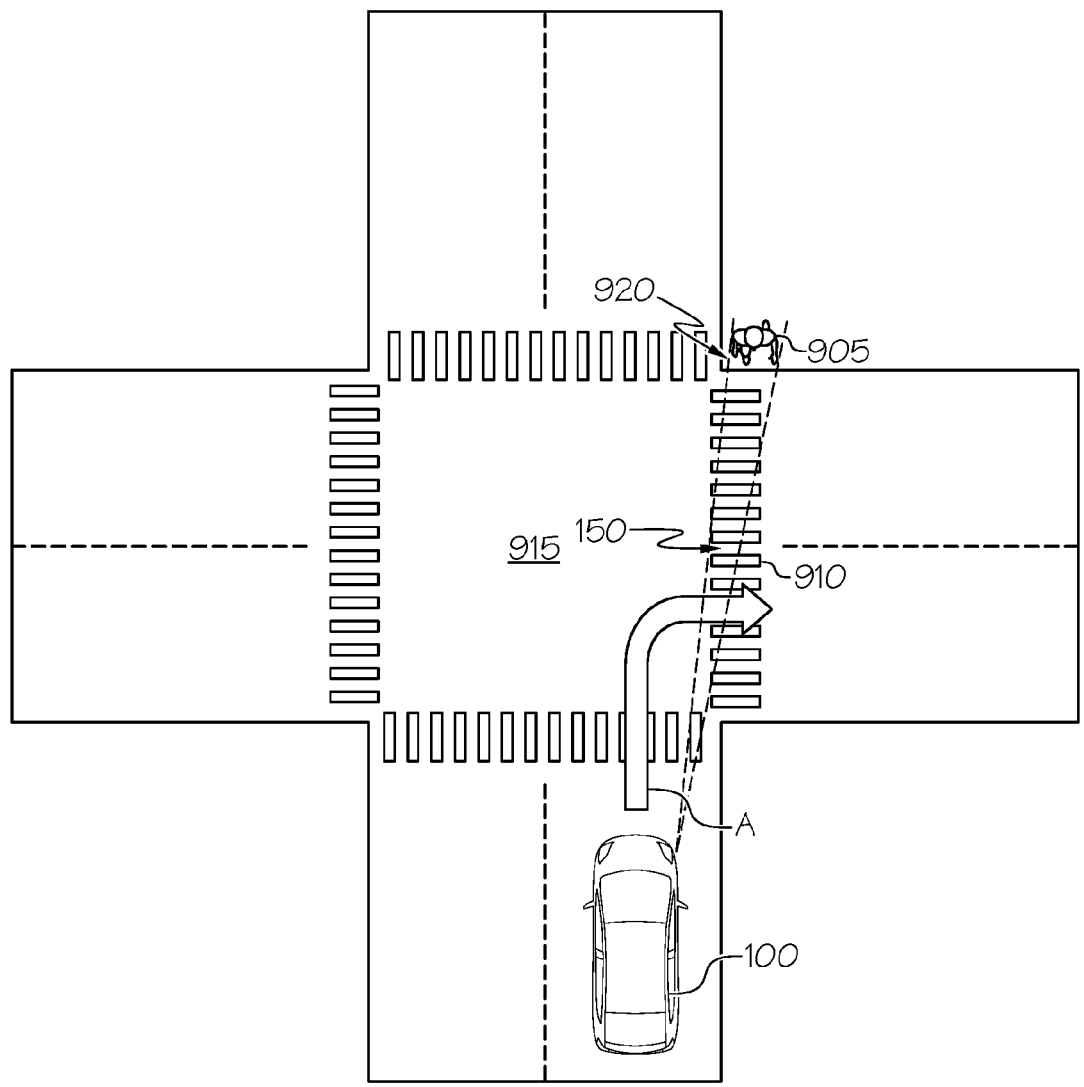
FIG. 9B depicts an illustrative schematic top view of a vehicle and a pedestrian at a corner of an intersection according to one or more embodiments shown and described herein.
Figure 9C:
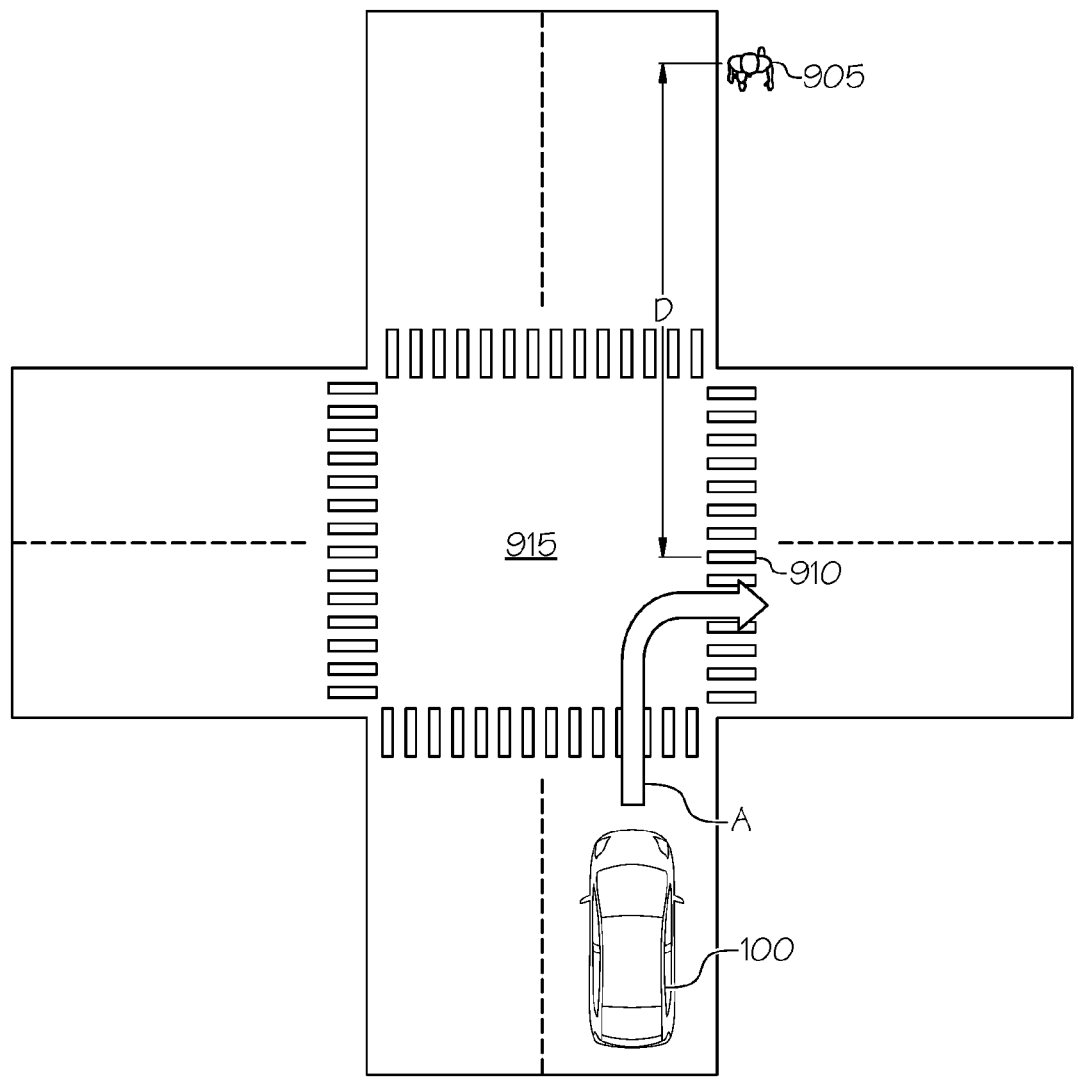
FIG. 9C depicts an illustrative schematic top view of a vehicle and a pedestrian at a distance from an intersection according to one or more embodiments shown and described herein.

If a turn is impending based on either a sensed turn or by the data received from the navigation system, the system may determine whether the turn will be in the vicinity of the detected pedestrian at step 820. For example, as shown in FIG. 9A, if the pedestrian 905 is in a crosswalk 910 of an intersection 915 and the vehicle 100 approaches the intersection 915 with the intent of turning toward the crosswalk (as indicated by arrow A), the system may determine that the turn will be in the vicinity of the pedestrian 905. In some embodiments, as shown in FIG. 9B, even if the pedestrian is not in the crosswalk 910 but still close to the intended turn of the vehicle (e.g., on a corner 920), the system may still determine that the turn will be in the vicinity of the pedestrian 905. The vicinity is not limited to a particular distance herein, but is rather any distance generally recognized where the respective paths of the vehicle 100 and the pedestrian 905 could reasonably result in a collision. However, it should generally be understood that, as shown in FIG. 9C, if the pedestrian 905 is a sufficient distance D away from the intended turn of the vehicle 100 that no collision is likely due to the speed at which the pedestrian 905 moves and the speed at which the vehicle 100 moves, the pedestrian 905 would not be considered to be within the vicinity of the vehicle 100.

Referring again to FIGS. 1-2 and 8, if the determination at step 820 is that the turn of the vehicle 100 is in the vicinity of the pedestrian, the process may proceed to step 665 of FIG. 6, as described in greater detail herein. If the determination at step 820 is that the turn of the vehicle 100 is not in the vicinity of the pedestrian, the process may proceed to step 655 of FIG. 6, as described in greater detail herein.

In some embodiments, while the vehicle 100 may not be actively making a turn that is sensed by one of the various means described herein, the vehicle 100 may nevertheless enter a portion of a roadway where a collision with a pedestrian is possible. For example, at step 830, a determination may be made as to whether a lane departure is sensed. Such a determination may be made based on lane departure signals and/or data received from a lane departure system of the vehicle 100 if the vehicle is so equipped. Lane departure systems should be understood and are not described in further detail herein. If no lane departure is sensed at step 830, the system may proceed to step 655 of FIG. 6. If a lane departure is sensed at step 830, a determination may be made as to whether the lane departure constitutes movement toward the pedestrian in step 835. For example, if the pedestrian is located in the vicinity of the passenger side of the vehicle 100 and the system receives a signal from the lane departure system that the vehicle is departing the lane on the right, the system may determine that the movement is towards the pedestrian. If the movement is towards the pedestrian, the system may proceed to step 665 of FIG. 6. If the movement is not towards the pedestrian, the system may proceed to step 655 of FIG. 6.

Referring again to FIGS. 1-2 and 6, at step 665, the system may signal the turn to the pedestrian. Such a signaling may be completed by providing an indicator from one or more of the pedestrian marking systems 105 (e.g., illuminating one or more of the LEDs 114 as previously described herein) and/or activating one or more of the turn signal indicators 102. Activating may include providing a colored light (e.g., an amber light) toward the pedestrian, providing a strobed light, flashing a light, and/or the like. The pedestrian may generally be signaled by activating a pedestrian marking system 105 and/or turn signal indicator 102 on a side of the vehicle 100 that corresponds to the direction that the vehicle 100 is turning or in some other manner that the pedestrian will recognize as meaning that the vehicle 100 is turning in a particular direction. Other means of providing a notification in a manner that is recognizable by the pedestrian are contemplated.

The pedestrian marking systems 105 may continuously monitor the location of the pedestrian with respect to the vehicle 100. Such a monitoring may be necessary to ensure that the collective beam 150 aimed at the pedestrian and/or the deluminated zone 151 thereof remains appropriately aimed as the pedestrian and/or the vehicle 100 move with respect to one another. In addition, such a monitoring may be necessary to ensure that the pedestrian is appropriately notified of the turn until after the pedestrian has been passed by the vehicle 100. Monitoring may include continuously receiving data from the one or more sensor modules 120 and determining whether the data indicates movement of the pedestrian.

At step 670, a determination may be made as to whether the pedestrian has been passed (e.g., the pedestrian is no longer located within the vicinity in which pedestrian marking lighting is necessary). If the pedestrian has been passed, the illuminated LEDs 114 and/or the turn signal indicators 102 may be deactivated and the process may return to step 610 to monitor for additional pedestrians.

As a result of the systems and methods described herein, as shown in FIGS. 9A-9B, the vehicle 100 may be traveling with the intention of turning in the intersection 915, as indicated by the arrow A. As the pedestrian 905 enters the vicinity of the vehicle 100 (e.g., whether in the crosswalk 910 or on the corner 920, the pedestrian marking systems of the vehicle 100 may project one or more collective beams 150 onto the pedestrian 905 and continuously adjust which LEDs are active such that the collective beams 150 continue to illuminate the pedestrian 905, even as the pedestrian 905 moves with respect to the vehicle 100. In addition, the vehicle may provide an indicator, either via the pedestrian marking systems or via the turn signal indicators, to notify the pedestrian of the intended turn.

Accordingly, the pedestrian marking systems and methods described herein determine a location and/or a movement of pedestrian within the vicinity of a vehicle, project a beam of light from the pedestrian marking lights towards the pedestrian to notify the pedestrian of the presence of the vehicle, move the projected beam of light as the pedestrian changes in position with respect to the system, and provide a signal of an intended turn to the pedestrian. In addition, the beams of light projected from the pedestrian marking lights are particularly aimed such that they do not temporarily blind the pedestrian and/or so that they do not emit light towards areas other than the pedestrian. Movement of the light beam projected by the pedestrian marking lights is achieved by using a plurality of LEDs that are particularly positioned and selectively activated according to the desired location of the light. Signalling of the turn is completed by activating one or more of the plurality of LEDs and/or activating one or more turn signal indicators.

It is noted that the terms "substantially" and "about" may be utilized herein to represent the inherent degree of uncertainty that may be attributed to any quantitative comparison, value, measurement, or other representation. These terms are also utilized herein to represent the degree by which a quantitative representation may vary from a stated reference without resulting in a change in the basic function of the subject matter at issue.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

What is claimed is:

1. A pedestrian marking system in a vehicle, the pedestrian marking system comprising:
    a light emitting module comprising a plurality of light emitting diodes;
    a sensor module; and
    a master controller comprising a non-transitory, processor readable storage medium containing machine-readable instructions that direct the master controller to:
        receive data from the sensor module, wherein the data provides an indication of a pedestrian located in the vicinity of the vehicle,
        determine location coordinates of the pedestrian with respect to the vehicle,
        determine a direction of light based on the location coordinates of the pedestrian such that the direction of light is aimed at the pedestrian,
        direct the light emitting module to selectively activate the plurality of light emitting diodes such that the plurality of light emitting diodes produce a collective beam that corresponds to the first direction, the collective beam comprising a deluminated zone that corresponds to an area projected onto the pedestrian that is aimed at a face of the pedestrian,
        determine that the vehicle is turning in a direction towards the pedestrian, and
        provide a notification to the pedestrian that the vehicle is turning.

2. The pedestrian marking system of claim 1, wherein the machine-readable instructions further direct the master controller to:
    determine second location coordinates of the pedestrian with respect to the vehicle when the pedestrian moves with respect to the vehicle to an area outside of the direction of the light;
    determine a second direction of light based on the second location coordinates such that the second direction of light is aimed at the pedestrian; and
    direct the light emitting module to selectively activate the plurality of light emitting diodes such that the plurality of light emitting diodes produce the collective beam that corresponds to the second direction.

3. The pedestrian marking system of claim 1, wherein the machine-readable instructions further direct the master controller to:
    determine that the pedestrian has moved outside the vicinity of the vehicle; and
    direct the light emitting module to deactivate the plurality of light emitting diodes.

4. The pedestrian marking system of claim 1, wherein the machine-readable instructions further direct the master controller to:
    activate the pedestrian marking system based on at least one of a power on of a vehicle in which the pedestrian marking system is installed, a detected ambient light level, and an activation of a headlight switch.

5. The pedestrian marking system of claim 1, wherein the light emitting module comprises the plurality of light emitting diodes arranged on a curved surface positioned such that each of the plurality of light emitting diodes is particularly positioned according to a curvature of the curved surface.

6. The pedestrian marking system of claim 1, further comprising one or more turn signal indicators, wherein the master controller provides the notification via the one or more turn signal indicators.

7. The pedestrian marking system of claim 1, wherein the light emitting module further comprises an LED controller for selectively activating the plurality of light emitting diodes.

8. The pedestrian marking system of claim 1, wherein the sensor module comprises an imaging device that images an area adjacent to the vehicle.

9. A method of providing pedestrian marking lighting on a vehicle, the method comprising:
    receiving, by a master controller of a pedestrian marking system, data from a sensor module, wherein the data is indicative of a pedestrian located in the vicinity of the vehicle;
    determining, by the master controller, location coordinates of the pedestrian with respect to the vehicle;
    determining, by the master controller, a direction of light based on the location coordinates of the pedestrian such that the direction of light is aimed at the pedestrian;
    directing, by the master controller, a light emitting module to selectively activate a plurality of light emitting diodes such that the plurality of light emitting diodes produce a collective beam that corresponds to the first direction, the collective beam comprising a deluminated zone that corresponds to an area projected onto the pedestrian that is aimed at a face of the pedestrian;
    determining, by the master controller, that the vehicle is turning in a direction towards the pedestrian; and
    providing, by the master controller, a notification to the pedestrian that the vehicle is turning.

10. The method of claim 9, further comprising:
    determining, by the master controller, second location coordinates of the pedestrian with respect to the vehicle when the pedestrian moves with respect to the vehicle to an area outside of the direction of the light;
    determining, by the master controller, a second direction of light based on the second location coordinates such that the second direction of light is aimed at the pedestrian; and
    directing, by the master controller, the light emitting module to selectively activate the plurality of light emitting diodes such that the plurality of light emitting diodes produce the collective beam that corresponds to the second direction.

11. The method of claim 9, further comprising:
    determining, by the master controller, that the pedestrian has moved outside the vicinity of the pedestrian marking system; and
    directing, by the master controller, the light emitting module to deactivate the plurality of light emitting diodes.

12. The method of claim 9, further comprising:
    activating, by the master controller, the pedestrian marking system based on at least one of a power on of a vehicle in which the pedestrian marking system is installed, a detected ambient light level, and an activation of a headlight switch.

13. The method of claim 9, wherein determining the location coordinates of the pedestrian comprises receiving data from the sensor module and mapping the location of the pedestrian to coordinate axes based on the data.

14. The method of claim 9, wherein directing the light emitting module to selectively activate a plurality of light emitting diodes comprises:

determining, for each of the plurality of light emitting diodes, a direction of an individual beam emitted from each of the plurality of light emitting diodes, wherein the direction is different for each individual beam;

determining a first portion of the plurality of light emitting diodes, wherein the first portion comprises ones of the plurality of light emitting diodes that emit an individual beam that corresponds to the direction of light; and directing the light emitting module to activate only the first portion of the light emitting diodes to produce the collective beam.

15. The method of claim 9, wherein determining that the vehicle is turning comprises at least one of receiving turn data from a vehicle navigation system, sensing one or more mechanical movements that indicate a turn, and receiving lane departure signals from a lane departure system.

16. The method of claim 9, wherein providing the notification to the pedestrian comprises directing the light emitting module to emit a turn indicator light.

17. The method of claim 9, wherein providing the notification to the pedestrian comprises directing one or more turn signal indicators to actuate.

18. A vehicle comprising:
a pedestrian marking system comprising:
- a light emitting module comprising a plurality of light emitting diodes and an LED controller for selectively activating one or more of the plurality of light emitting diodes in a pattern to produce a particularly aimed collective beam of light and to produce a turn indicator light;
- a sensor module; and
- a master controller comprising a processing device and a non-transitory, processor-readable storage medium, the non-transitory, processor-readable storage medium comprising one or more programming instructions that, when executed, cause the processing device to:
  - receive data from the sensor module, wherein the data is indicative of a pedestrian located in the vicinity of the vehicle,
  - determine first location coordinates of the pedestrian with respect to the vehicle,
  - determine a first direction of light based on the first location coordinates of the pedestrian such that the first direction of light is aimed at the pedestrian,
  - direct the LED controller to selectively activate the plurality of light emitting diodes such that the plurality of light emitting diodes produce a collective beam that corresponds to the first direction,
  - determine that the vehicle is making a turn in a direction towards the pedestrian,
  - direct the light emitting module to emit the turn indicator light in the direction of the turn, and
  - when the pedestrian moves with respect to the vehicle to an area outside of the direction of the light:
    - determine second location coordinates of the pedestrian with respect to the vehicle,
    - determine a second direction of light based on the second location coordinates such that the second direction of light is aimed at the pedestrian, and
  - direct the light emitting module to selectively activate the plurality of light emitting diodes such that the plurality of light emitting diodes produce the collective beam that corresponds to the second direction.

19. The vehicle of claim 18, wherein the collective beam comprises a deluminated zone that corresponds to an area projected onto the pedestrian that is aimed at a face of the pedestrian.

* * * * *